United States Patent [19]
Milanian

[11] Patent Number: 6,115,974
[45] Date of Patent: Sep. 12, 2000

[54] INTEGRATED ENTERTAINMENT AND RESORT COMPLEX

[76] Inventor: Cyrus Milanian, 2070 SE. 16th St., Pompano Beach, Fla. 33062

[21] Appl. No.: 09/281,470

[22] Filed: Mar. 30, 1999

Related U.S. Application Data

[60] Provisional application No. 60/120,259, Feb. 16, 1999.
[51] Int. Cl.[7] ..................................................... E04H 3/10
[52] U.S. Cl. ........................ 52/169.2; 52/169.1; 472/13; 472/136
[58] Field of Search ............................... 52/169.1, 169.2, 52/174, 175, 234; 472/13, 136

[56] References Cited

U.S. PATENT DOCUMENTS

| | | | |
|---|---|---|---|
| 3,916,588 | 11/1975 | Magill | .................................... 52/175 X |
| 4,653,240 | 3/1987 | Jenn | ........................................ 52/169.2 |
| 4,901,482 | 2/1990 | Lockard et al. | .................... 52/169.2 X |
| 5,564,239 | 10/1996 | Mitsis | .................................... 52/234 X |

OTHER PUBLICATIONS http://www.Disneyworld.com, 1999.
http://www.MallofAmerica.com, 1999.

*Primary Examiner*—Carl D. Friedman
*Assistant Examiner*—Kevin D. Wilkens
*Attorney, Agent, or Firm*—Oltman, Flynn & Kubler

[57] ABSTRACT

An integrated entertainment and resort complex, which includes at least a first transportation hub; at least one shopping mall communicating with the transportation hub; and at least one riverwalk communicating with the transportation hub. The complex may include at least a second transportation hub communicating with at least one of the riverwalk and the shopping mall, and at least one of the transportation hubs includes an airport. At least one of the transportation hubs includes a railroad station, a bus station, or airport facilities. The shopping mall connects at least partway the first and second transportation hub, and the riverwalk may connect at least partway the first and second transportation hub. The above complex may include a waterway arranged at least partway in parallel with the riverwalk, and at least part of the waterway may form a closed loop. The complex includes at least one bridge crossing and waterway, or preferably a plurality of bridges crossing the waterway, and wherein one or more of the bridges is a retractable bridge, having retracting devices connected with the bridge, and manual control devices connected with the retracting devices for operating the retracting devices. The complex includes at least one barge floating in the waterway, wherein the barges include propulsion ways of propelling the barges along the waterway, and the propulsion ways include for example an electrically driven, or a compressed air driven, or possibly an internal combustion driven motor. The barges are primarily arranged to carry passengers along the waterway. The barges will preferably have flotation level control devices, having flotation level sensing devices connected with leveling water tanks, which are operative for floating the barge at a preset flotation level.

21 Claims, 4 Drawing Sheets

INTEGRATED ENTERTAINMENT AND RESORT COMPLEX

This application claim benefit to U.S. provisional application 60/120,259 filed Feb. 16, 1999.

The invention relates to an integrated entertainment and resort complex, which includes at least one transportation hub, a shopping mall communicating with the transportation hub, a riverwalk with a waterway connected with the shopping mall, and public facilities integrated with the shopping mall and the riverwalk.

BACKGROUND AND PRIOR ART

Large integrated entertainment and resort complexes, usually also including shopping facilities as part of the complex have been developed within the last several decades. Typical of such complexes are for example, the Disney World complex in central Florida and the "Strip" of Las Vegas.

The present invention contemplates a further expansion of the concept of the entertainment and resort complex to provide integration of resort and entertainment facilities with facilities for enabling a wider sector of the public to enjoy such facilities providing an integrated combination of entertainment, resort and people-moving facilities.

SUMMARY OF THE INVENTION

In accordance with the inventive concept, there is provided an integrated entertainment and resort complex, which includes at least a first transportation hub; at least one shopping mall communicating with the transportation hub; and at least one riverwalk communicating with the transportation hub. The complex may further include at least a second transportation hub communicating with at least one of the riverwalk and the shopping mall, and wherein at least one of the transportation hubs includes an airport.

The invention may further provide that at least one of the transportation hubs includes a railroad station, a bus station, or airport facilities According to a further feature, the shopping mall connects at least partway the first and second transportation hub, and the riverwalk may connect at least partway the first and second transportation hub.

In addition, the above complex may include a waterway arranged at least partway in parallel wish the riverwalk, and wherein at least part of the waterway may form a closed loop.

According to an additional feature, there is provided a complex which includes at least one bridge crossing and waterway, or preferably a plurality of bridges crossing the waterway, and wherein one or more of the bridges is a retractable bridge, having retracting means connected with the bridge, and manual control means connected with the retracting devices for operating the retracting devices.

According to still another feature, the complex includes at least one barge floating in the waterway, wherein the barges include propulsion means for propelling the barges along the waterway, and the propulsion means include for example an electrically driven, or a compressed air driven, or possibly an internal combustion driven motor. The barges are primarily arranged to carry passengers along said waterway. The barges will preferably have flotation level control devices, having flotation level sensing devices connected with leveling water tanks, which are operative for floating the barge at a preset flotation level.

According to still another feature, the shopping mall includes a plurality of public facilities and a pedestrian way connecting at least part of the public facilities and the shopping facilities. The complex as presently contemplated will have roof and wall facilities 11 forming at least one shopping enclosure for the shopping facilities, and air-conditioning 17a connected with the shopping enclosure, for providing all-weather comfort within the enclosure.

According to an additional feature, the complex, as envisioned, includes lighting arrangements in the shopping enclosure for providing daylight-like lighting for the shopping enclosure.

According to still another feature, the waterway runs at least partway through said enclosure.

The complex according to the invention may include in the shopping facilities a theme park, wherein the theme park includes a virtual reality display for displaying selected themes of interest to a general public. The shopping facilities preferably include a street lined with trees and plants, flowers and other decorative features. The shopping mall preferably may include free-of-charge restroom facilities, and can additionally include high-capacity people moving facilities from at least one of the transportation hubs to the shopping mall. The waterway may also be lined at least partway with trees and green plants.

According to an additional feature, the waterway includes a concrete-lined trench filled with water, and water-level control means for maintaining the water at a preset level. Furthermore, the complex can include a plurality of barges forming a waterborne people-carrying transportation system, and have a plurality of barge stops for embarking and disembarking passengers at selected stops along said waterway.

As presently contemplated, the people-carrying transportation system has a people carrying capacity of at least 72 persons every two minutes. As a further feature, the waterway can be stocked with fresh water fish 65.

Further objects and advantages of this invention will be apparent from the following detailed description of a presently preferred embodiment, shown schematically in the accompanying drawings.

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

In recent decades a trend has emerged, especially in the industrialized countries, toward more prosperous lifestyles, greater mobility and longer life spans, and more time has become available for travel and relaxation. In view of these trends applicant has concluded that a market will be developing in direction of more pervasive integrated entertainment, lodging and resort facilities, and that such facilities will develop especially in locations that offer easy and convenient transportation for people and goods combined with a naturally enhancing ambience.

In view of these observations, applicant believes that in order to be successful, such facilities should be planned well in advance so that all resources can be brought to beam in an efficient and coordinated manner. To that end applicant herewith presents plans that contemplate development of an attractive, typical and efficiently operating integrated entertainment, lodging and resort complex.

A typical complex of this type is envisioned to be, within an estimated time span of e.g. 15–20 years, in proximity of one of U.S's largest cities situated advantageously in an area of benign climate and attractive and healthy climate. The city, as envisioned, will be attracting an affluent, well-educated permanent resident base, which has in turn led to creation of an infrastructure large enough to support a large tourism industry, wherein the ambience offered for living matches the opportunities offered for working.

An area suitable for such developments will typically have enlightened policies toward business in general, including the gaming industry, and have an infrastructure large enough to permit continuous expansion of its industry in general, and also the business of tourism.

Figure 1A:
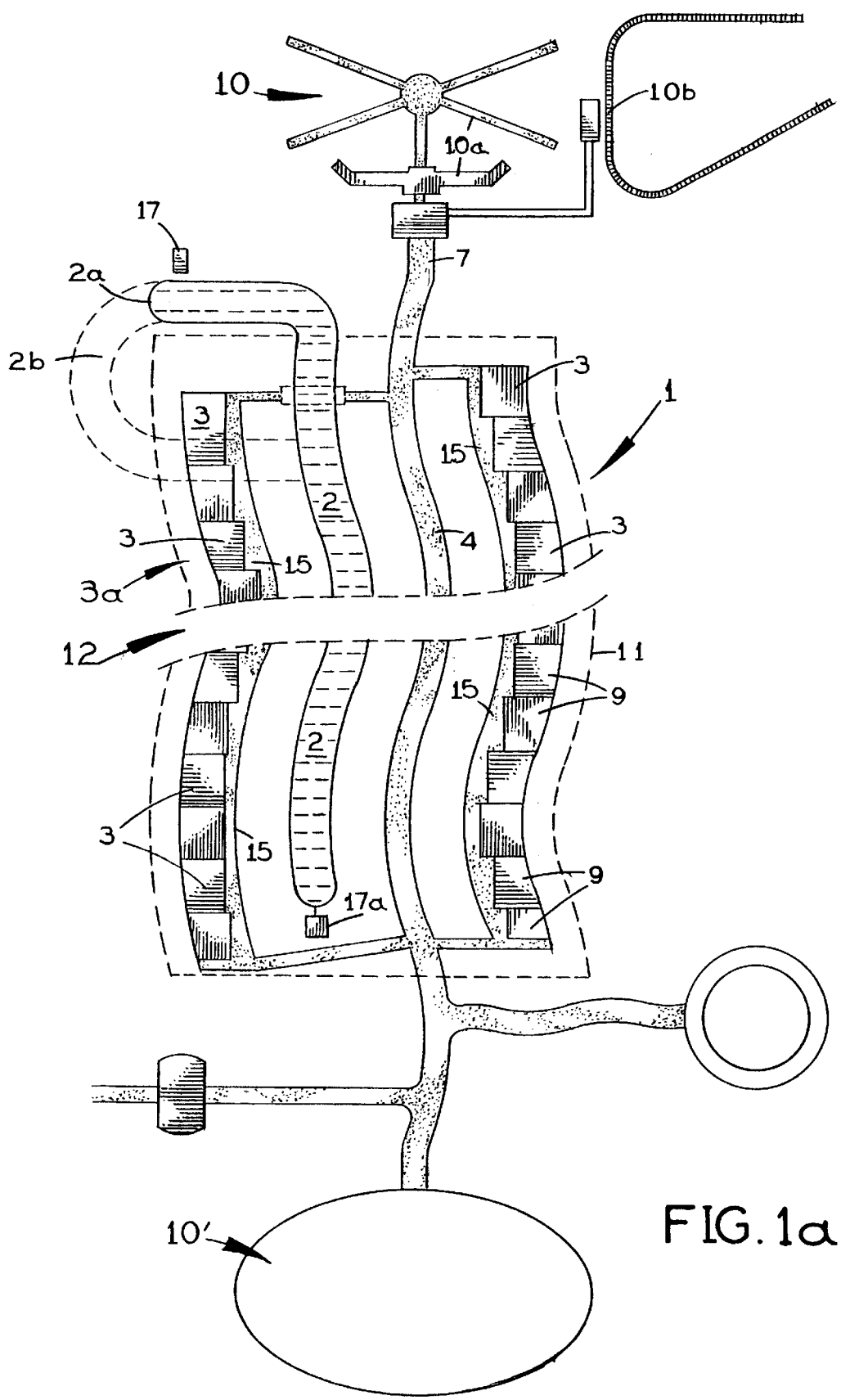
FIG. 1a is a simplified bird's eye view of an exemplary embodiment of an integrated entertainment and resort complex according to the invention, showing two transportation hubs, a shopping mall with a pedestrian way, and a riverwalk disposed between the two hubs.
Figure 1B:
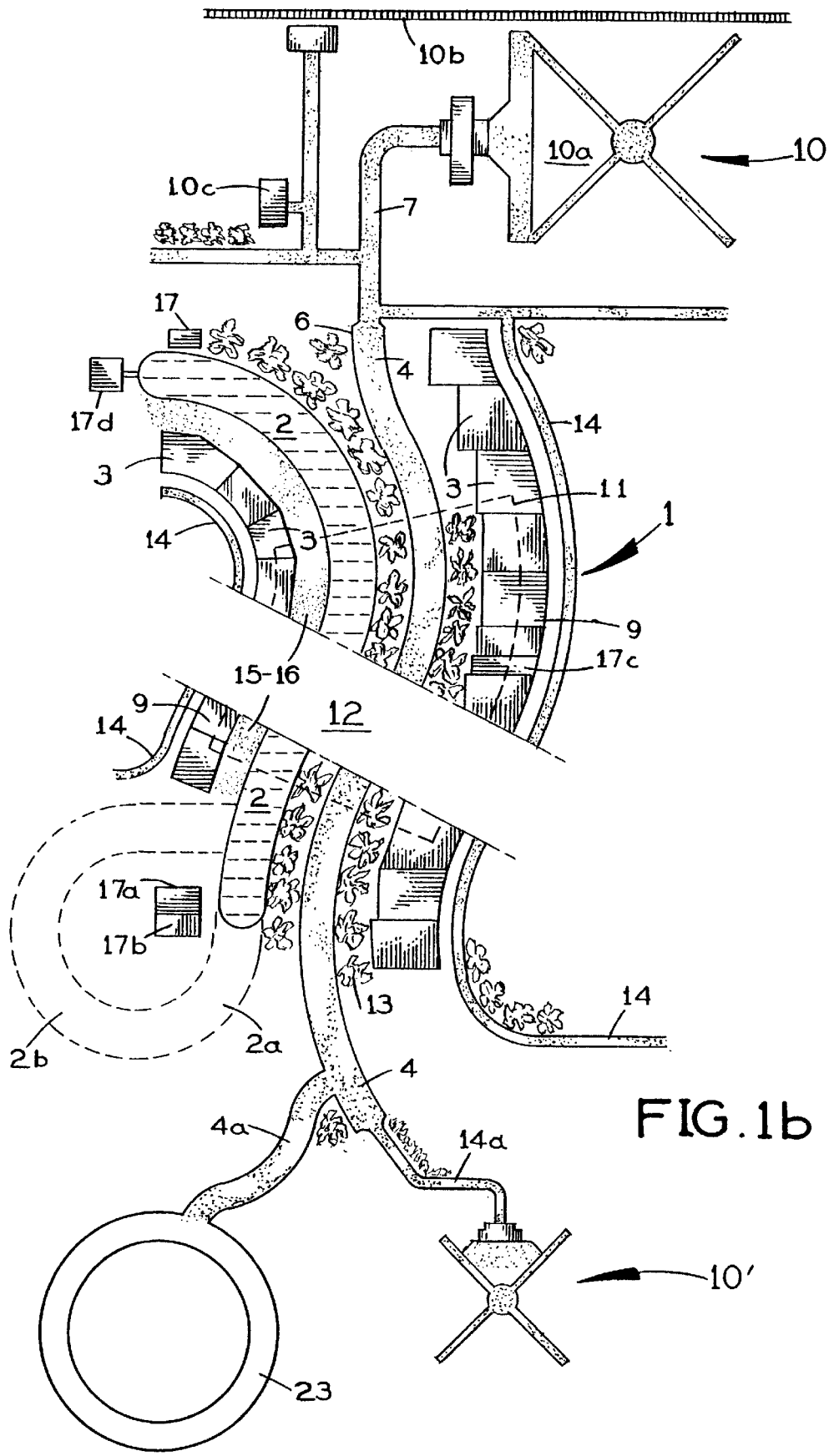
FIG. 1b is a more detailed bird's eye view of the exemplary embodiment of the complex according to FIG. 1a, showing a looped waterway, bridges, and a partially enclosed climate-controlled shopping mall with a pedestrian way, and further details of the transportation hubs.

The area suitable for such developments, as proposed herein, will have in its proximity at least one large transportation hub, which includes at least an airport 10*a*, FIG. 1*a*, and presumably high speed rail links 10*b*, FIG. 1*a*, and/or a bus station 10*c*, FIG. 1*b*, and adequate energy, water and waste management technology and related disciplines.

The area suitable for the afore-mentioned development will advantageously include a core business section primarily catering to the tourist industry, including core facilities for entertainment, lodging and people transport and resort facilities.

It will furthermore have real estate proximal thereto which is suitable for constructing a long, winding waterway, in the following named "riverwalk," running substantially parallel to, or proximal to the aforesaid core facilities. The riverwalk, as presently contemplated, will be described in more detail below.

Combined with the waterway there will be a broad long semi-enclosed environmentally conditioned, substantially free of wheeled traffic, a shopping mall 3*a*, advantageously communicating at least at one end with the aforesaid transportation hub, or between e.g. two transportation hubs 10, 10'.

The riverwalk, it follows, need not be one continuous part, but may be divided into sections so as to best accommodate existing geographic features of the area.

As contemplated and briefly mentioned above, one or more transportation hubs will be elements of the inventive concept. The transportation hub 10, 10', FIG. 1*a* will advantageously include an international class airport 10, 10', FIG. 1*a* having runways accommodating large aircraft. It may, for example, be a former military airport. The transportation hub 10, 10', FIG. 1*a* may further include high-speed rail facilities 10*b*, FIG. 1*a,* and tourist bus facilities for efficiently moving visitors to and from the above-mentioned shopping mall and riverwalk.

The shopping mall provides access to every property fronting the mall. The shopping mall includes an all-season partially enclosed, climate controlled, lighted and regulated pedestrian way.

Figure 2:
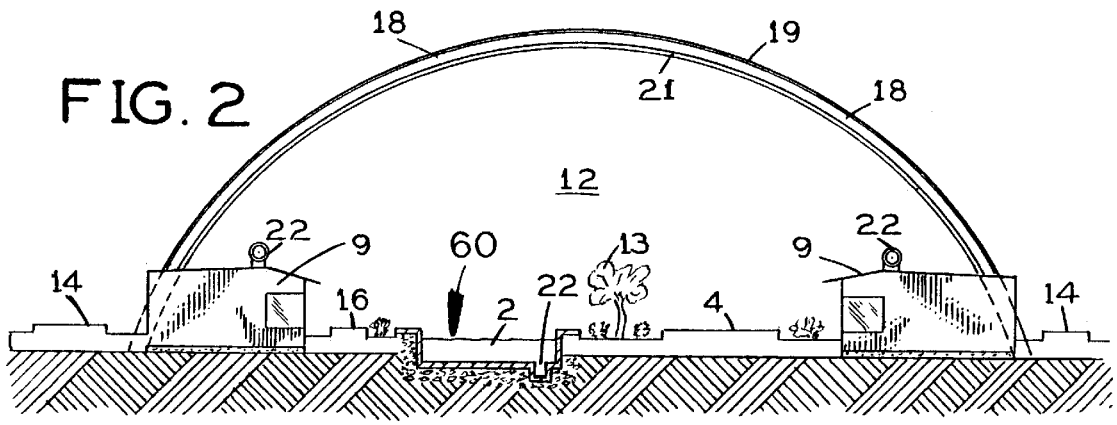
FIG. 2 is an exemplary cross-sectional view of the shopping mall with shops, waterway, pedestrian way and structural details of the enclosed part of the mall.

The roof 19, FIG. 2 of the shopping mall extends from at least property line to property line offering visitors a place to shop, visit and be entertained in all-weather comfort 24 hours a day. It may have a sector which is enhanced by routing a leg of the riverwalk under the roof of the shopping mall, and can be contiguous with the riverwalk for at least a part of its length. The water in the river flow assists with enhancing the humidity and temperature control of the overall mall environment.

As presently contemplated, the mall includes a broad tree and plant-lined avenue, FIG. 1*b* dotted with sidewalk cafes and a variety of large and small shops for the delight of visitors. As further contemplated, an open access from the mall into major theme resort properties is provided without the need for dodging life-threatening vehicular traffic, as is frequently a problem in contemporary mall areas. Advantageously, free of payment rest room facilities are provided.

Creation of the mall opens numerous opportunities for development of hotel style properties or "theme resorts," and offers numerous locations for establishment of additional dining, shopping and recreational facilities. As presently contemplated, advantageoulsy a casino, hotel and resort owners' associations will be established to represent every tourist-orient property in the area, and will strongly support the planning, construction and operation of the entire complex of guest-oriented facilities in coordination with the authorities of the area.

As further contemplated, existing businesses holding business licenses in the greater area addressed in this specification will be given first right of refusal to either locate or expand into newly created commercial spaces.

As briefly touched upon above, presence of truly rapid transit and people-moving facilities that allows visitors and residents alike access to the mall and riverwalk facilities is a key to success of the entire project.

As presently contemplated, the riverwalk is a substantially man-made river and walkway complex. It may, it follows, incorporate existing water and walkways, if available, but is, for the purpose of this disclosure, considered to be substantially man-made. It communicates with at least one of the aforesaid transportation hubs.

The river is seen as flanked on both sides by eye-appealing green plant and tree lined areas, including on both sides broad, e.g. 10 foot wide, side walks fronting numerous shops, pubs, entertainment centers and sidewalk cafes, which will be a major tourist and shopping mecca for the entire area. The entire expanse of the riverwalk, as presently contemplated, is softly and safely bathed by lighting e.g. from underwater, from dusk till dawn.

As mentioned above, at least one leg of the riverwalk runs under a roof contiguous with the shopping mall for some distance, e.g. three to four miles, and may encircle some prominent area feature such as a convention center, exhibition hall, theme park, or the like.

The "river," as presently contemplated is a concrete-lined, e.g. fifty (50) foot wide and five (5) feet deep trench, whose water level is maintained from preferably existing natural or treated water facilities, which will maintain the water depth at a constant e.g. three and one half (e.g. 18 inches below the river bank) to compensate for river water loss due to evaporation and for other losses due to dust removal and skimming, as well as water treatment and water clarification processes. Surplus water not needed for river water level maintenance or evaporative cooling may normally be reinjected into the ground via deep well pumping for groundwater replenishment.

The river and its adjoining real estate may typically incorporate several hundred acres of real estate, which are sub-divided into parcels, which constitute shopping and entertainment facilities for the area complex.

As presently contemplated, eminent domain will be vested in an area DISTRICT, which, as developer, becomes the landlord for the entire complex.

A waterborne transportation system including a fleet of unsinkable people-carrying self-propelled barges, each e.g. 12 ft. wide×48 ft. long×3½ ft. deep, but with only 14 in. draft transits the "river" in both directions at frequent intervals 24 hours a day, making numerous stops for rider convenience. The e.g. electric-powered waterjet-propelled barges, requiring e.g. two operators each, are automatically ballasted and deballasted to maintain a uniform level height with the riverbank walkway for safe level and rapid boarding and departing.

The riverwalk assumes a major role in the overall fast and convenient people transport system of the entire complex, carrying as many as 72 persons each way at e.g. two to four minute intervals in each direction. As many as 60,000 persons per day can be accommodated on this free municipal water-based transportation system.

As further contemplated, automatically retractable bridges can be placed along the river banks to quickly enable pedestrians to cross the river at selected intervals.

The riverwalk may incorporate a novel system for crossing the river—literally parting the waters in Moses (or Charleton Heston) style at roughly city block intervals for sidewalk level river crossing without the necessity to climb stairs or even the steps up or down, thus, if desirable, avoiding a jungle of overhead pedestrian bridges that may be difficult to manipulate and possibly unsightly and confining.

Describing now the elements of the invention, it is to be understood that the various elements are shown in juxtaposition, but that they may, in accordance with the inventive concept, be arranged in different ways, and that the inventive concept resides in the combination and mutual cooperation of the various elements disclosed herein, as will become clear from the following detailed description of the invention and the accompanying figures, and not in the particular illustrated mutual arrangement of the elements.

FIG. 1a shows a simplified layout of an integrated entertainment and resort complex, in the following called the "complex", generally located at 1. The major elements include a waterway 2, in the following called the "river", and a plurality of shops, cafés, restaurants and entertainment and lodging facilities, etc. at 3, shown cross-hatched, preferably arranged along a major pedestrian artery, in the following called the "riverwalk" 4. The riverwalk 4 may be straight, or meandering as shown, and is at least at one end connected via a corridor 7 with a major transportation hub 10, and optionally at the other end with another transportation hub 10'. The riverwalk 4 is flanked, at least at one side, and preferably at both sides by the facilities 3, shown cross-hatched as individual small blocks 9, each representing e.g. a shop, a lodging facility, a café, a boutique, theme park, etc.

The facilities may include one or more theme parks developed around themes of general interest and/or themes related to the history and lore of the particular state or region, in which the complex is located. Reference should be had to applicant's copending patent application, Ser. No. 09/184,603 disclosing an approach to theme park structures well suited to this purpose.

The river 2 runs, at least part way, in parallel with the riverwalk 4. It may include an artificial water-filled concrete-lined trench 60 as shown in cross-section in FIG. 5. It may be connected with another existing natural or artificial waterway not shown, or it may be completely self-contained. The river 2 may be branching away from the riverwalk at 2a (FIG. 1b), or it may be looping back to the main water 2, as shown in dashed lines 2b. The waterway may contain fish 65.

A part of the blocks 9, or all of them, may be situated within the enclosed area, mentioned above as the mall 12, bordered by the dashed line 11. The enclosed mall 12 is a premium area which is, as also described above, climate-controlled with climate control unit 17a, FIG. 1a and FIG. 1b, and is traversed by the river 2 and the riverwalk 4. The riverwalk 4 runs at least part way or substantially in parallel with the river 2, and is finely bordered by trees 13, flowers and the like, and all efforts are made to give it a pleasant and attractive ambience.

The mall 12 is typically formed as an elongate area as indicated by the stippled lines delineating the mall 12. The facilities 3 border the mall area at their front sides facing the mall, while the backsides face a service road 14 seen only in FIG. 1b. It follows that the various facilities 3, depending on their particular nature will be of different sizes and will therefore have different height and length along the front side, and that they may also have different dimensions in direction to the service road 14.

Pedestrian access to the facilities 9 at the left bank of the river 2 may be provided by means of a second riverwalk 15, or by means of a more narrow walkway 16 (FIG. 1b) facing the left hand bank of the river 2. It follows that the decision as to the establishment of a walkway 16 or another riverwalk may be an economical one, as well as a matter of aesthetics and/or other considerations. The left bank will typically be more quiet and less busy and may attract facilities such as lodgings and certain types of restaurants and other facilities favoring a more quiet ambience.

As presently contemplated, a number of retractable bridges will be placed along the riverwalk 4. Another solution may be provided by crossing via barges momentarily stopping side-by-side to allow passengers to cross. Fixed bridges may be still another solution.

Figure 8:
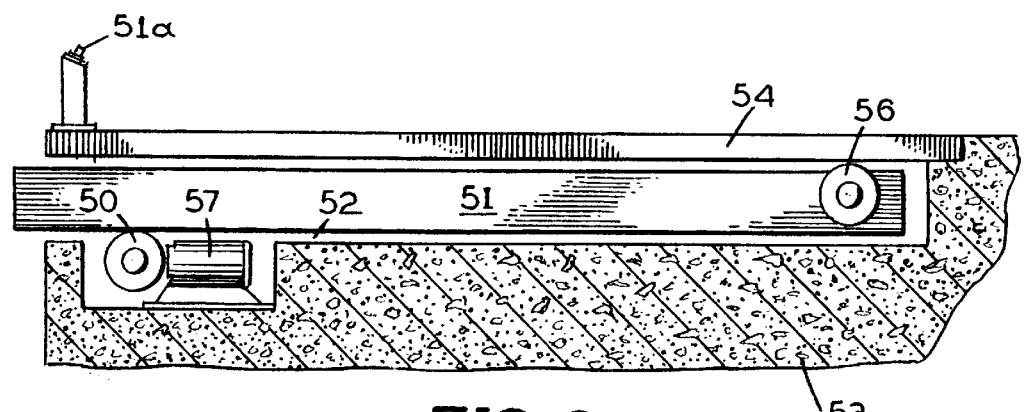
FIG. 8 is an elevational view of the waterway and details of a retractable bridge.

FIG. 8 shows an approach to the construction of a retractable bridge having a rolling bridge span 51 recessed in a trench 52 in the river bank 53. The right hand end of the bridge span has an upward-facing roller 56 contacting a trench cover 54 bolted down to the concrete river bank 53, and another upward-facing roller 50 connected with the trench 52, and coupled to a drive motor 57, which is activated when the bridge span 51 is to be extended. The controls for the motor 57 can have many forms, and are advantageously coupled to a pedestrian activated push-button 51a. The details of the motor controls are not further disclosed, since such controls can readily be devised by persons of ordinary skills in control technology.

A barge maintenance and recharging station 17 is shown proximal to the river bank or river 2 (FIG. 2).

FIG. 2, briefly mentioned above, shows a mall cross-section having the facilities 9 at each side, flanked by service roads 14, the river 2, and the riverwalk 4, running along the river 2, and the walkway 16. A plurality of arches 18, span the entire mall 12. The structural features of the arches 18 will be based on engineering, aesthetic, economical and other considerations and need not be described in more detail, since such structures are well-known from the art of civil engineering. The arches 18 support an outer weather-proof layer of sheathing 19 and may have an inner lining 21 of e.g. seamless sound-dampening material of suitable composition, such as sprayed-on lightly colored flock or cotton or the like.

The perimeter 11 of the mall enclosure, FIGS. 1a and 1b, may advantageously indicate a location of a gated perimeter, allowing only visitor access by ticketed visitors via appropriately located entrances. Any of the facilities 9 could be arranged as a ticket booth, combined with e.g. a visitor welcoming center.

A convention center or arena 23 (FIG. 1b) may readily be incorporated into the complex by extending the riverwalk 4 by a branch 4a reaching the center or arena.

Figure 9:
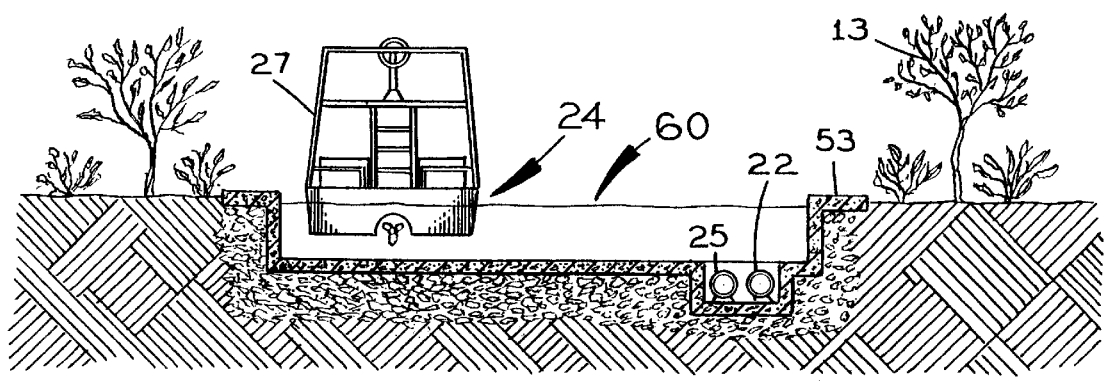
FIG. 9 shows the light projectors in a well in the bottom of the trench.

Light projectors 22 (FIG. 9), placed at suitable spacings in wells 25 in the bottom of the river water, project a muted soft light onto the lining 21.

While FIGS. 1a and 1b show an integrated entertainment and resort complex having essentially an elongate structure which is well suited to many locations that are substantially linear in shape, it is important to note that the invention can alternatively be configured in a more center-oriented style, in which case the river 2 and the riverwalk 4 could be forming a loop or a partial loop, or any other suitable geometry, again communicating with one or more transportation hubs 10, 10' as local conditions may indicate. In such cases, the semi-enclosed mall may take the shape of a loop, or a partial loop figure, for example covered by a looping or a circular roof structure or dome.

Figure 3:
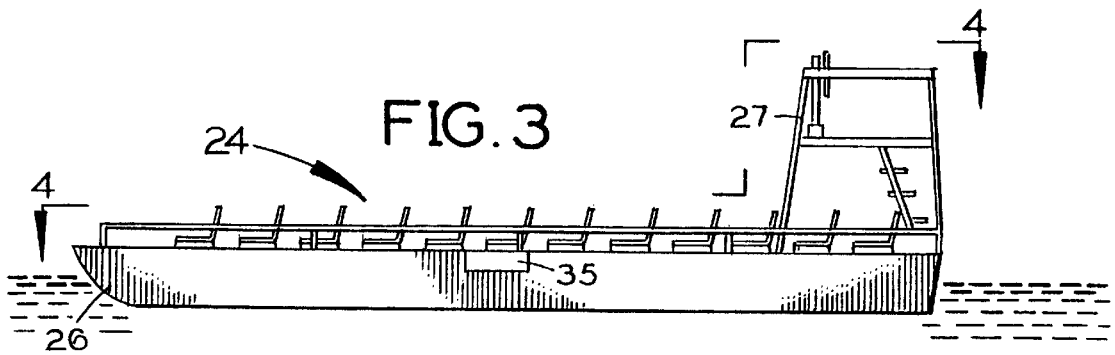
FIG. 3 shows a side elevation of a barge in the river.
Figure 4:
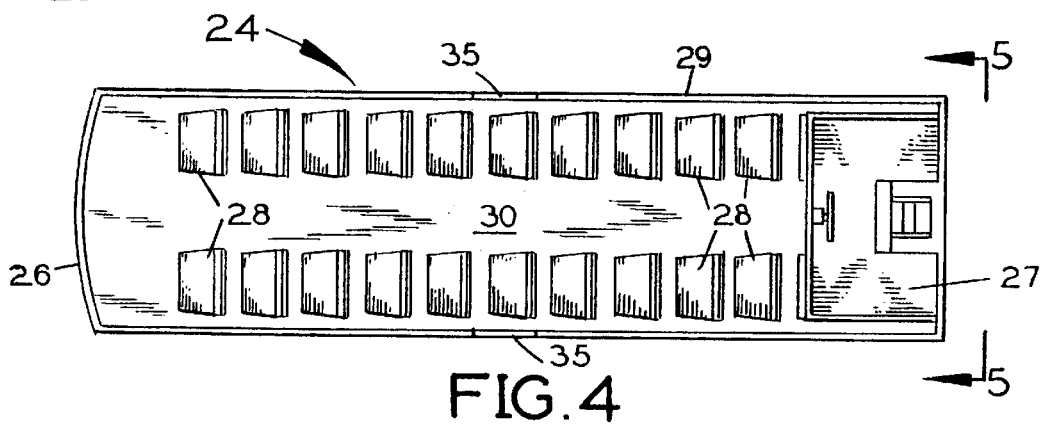
FIG. 4 shows a top down view of a barge.

FIG. 3 shows a side elevation of barge 24 indicated in the river 2. FIG. 4 shows the barge 24 in top down view, wherein the hull 26 has a deck 30 with a plurality of seats 28 for e.g. about 40 passengers.

A pilot's station 27 is shown raised above the seats 28 to give the pilot a view of the river and traffic on the river. FIG. 4 shows the deck space with a railing 29 around the deck space. The railing has on each side an entrance-exit passage 35.

Figure 5:
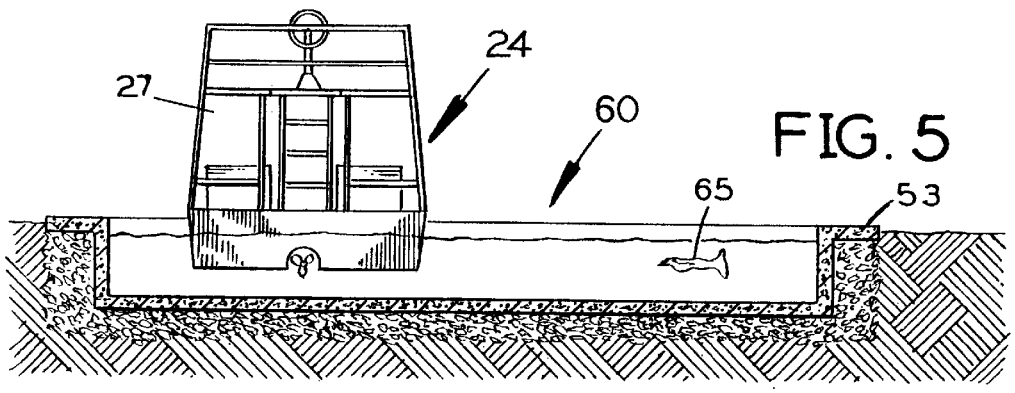
FIG. 5 shows a view of a barge seen from the stern along the line 5—5 of FIG. 4.
Figure 6:
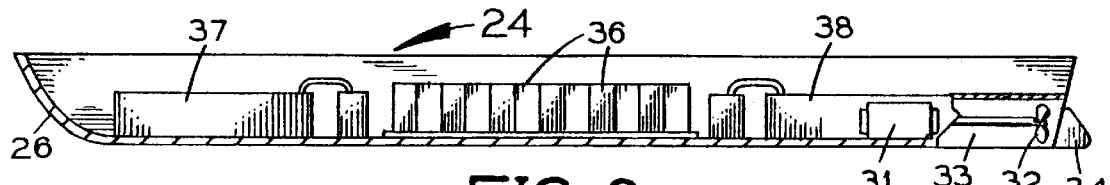
FIG. 6 is a side view in cross-section of the interior of a barge.

FIG. 5 is a view of the barge seen from the stern seen along the line 5—5 of FIG. 4. FIG. 6 is a side-view in cross-section of the interior of the barge, showing a propulsion motor 31 driving a propeller 32 in a tunnel drive, and a rudder 34. A bank of storage batteries 36 drive the motor under control of the pilot of the boat. Alternatively, the barge may be driven by compressed air contained in compressed air tanks, driving an air-driven motor connected to the propeller. As another alternative, the barge may be driven by an internal combustion engine, fuelled by natural gas, or methane or the like contained in compressed air tanks, not shown. FIG. 6 also shows a respective forward and aft leveling tank 37 and 38. This leveling system operates to automatically keep both ends of the barge at a preset level, regardless of the passenger loading.

Figure 7:
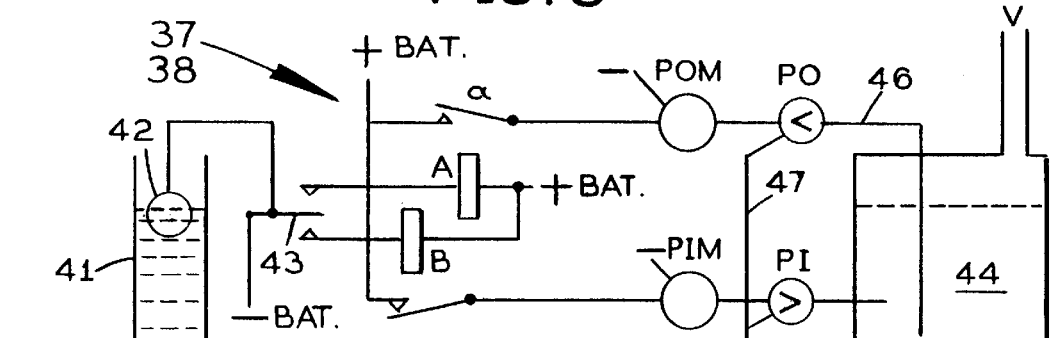
FIG. 7 shows the details of the leveling device of a barge.

FIG. 7 shows details of the leveling device 37, 38, wherein the bottom 39 of the barge has a vertical well 41, open to the water below the barge and containing a float 42, connected to a two-position contact arm 43, connected to a÷Battery BAT. If the barge sinks due to increased passenger load, the float 42 rises, and contact 43 energizes relay A, which closes contact "a", which in turn activates a pump-out motor POM, driving a pump-out pump PO. The pump-out pump removes water in a leveling tank 44 and discharges it via pump-out tube 46 and discharge tube 47, lightening the barge. Conversely, if the passenger load is decreased, the barge will rise, causing float 42 to sink, relative to the barge, and contact 43 will energize relay B, which in turn activates pump-in motor PIM, driving pump-in pump PI, increasing the water level in leveling tank 44, increasing the weight of the barge.

As contemplated, a leveling device, FIG. 7, is located below deck at each end of the barge. Due to the leveling devices, the barge deck will automatically at all times be level with the river bank, making it easy for passengers to step on and off the barge.

I claim:

1. An integrated entertainment and resort complex, comprising:
    at least a first transportation hub;
    at least one shopping mall communicating with said transportation hub; and
    at least one riverwalk communicating with said transportation hub;
    at least a second transportation hub communicating with at least one of said riverwalk and shopping mall;
    wherein said shopping mall connects at least partway said first and second transportation hubs;
    wherein said riverwalk extends at least partway the distance between said first and second transportation hub;
    a waterway disposed proximal to and extending at least partway in parallel with said riverwalk;
    at least one barge floating in said waterway; and
    flotation level control means, including flotation level sensing means connected with leveling water tanks, operative for floating said barge at a preset flotation level.

2. A complex according to claim 1, wherein at least one of said transportation hubs includes an airport.

3. A complex according to claim 1, wherein at least one of said transportation hubs includes a railroad station.

4. A complex as in claim 1, wherein at least one of said transportation hubs includes a bus station.

5. A complex as in claim 1, wherein at least part of said waterway forms a closed loop.

6. A complex as in claim 1, including at least one bridge crossing said waterway.

7. A complex as in claim 1, including a plurality of bridges crossing said waterway.

8. A complex as in claim 7, wherein at least one of said bridges is a retractable bridge.

9. A complex according to claim 8, including retracting means connected with said bridge, and manual control means connected with said retracting means for manually operating said retracting means.

10. A complex as in claim 1, wherein said barge is arranged to carry passengers along said waterway.

11. A complex according to claim 1, additionally comprising a shopping enclosure, and lighting means in said shopping enclosure for providing daylight-like lighting for said shopping enclosure.

12. A complex according to claim 1, wherein said shopping mall includes free-of-charge restroom facilities.

13. A complex according to claim 1, including high-capacity people moving facilities from at least one of said transportation hubs to said shopping mall.

14. A complex as in claim 1, including at least one barge a plurality of barges forming a waterborne people-carrying transportation system, having a plurality of barge stops for embarking and disembarking passengers at selected stops along said waterway.

15. A complex as in claim 1, wherein said waterway is stocked with fish.

16. A complex as in claim 1, wherein said barge includes propulsion means for propelling said barge along said waterway.

17. A complex as in claim 16, wherein said propulsion means include at least one of an electrically driven, a compressed air driven and an internal combustion driven motor.

18. An integrated entertainment and resort complex, comprising:
  at least a first transportation hub;
  at least one shopping mall communicating with said transportation hub;
  at least one riverwalk communicating with said transportation hub;
  at least a second transportation hub communicating with at least one of said riverwalk and shopping mall;
  wherein said shopping mall connects at least partway said first and second transportation hub;
  wherein said shopping mall includes shopping facilities, and a plurality of public facilities, and a pedestrian way connecting at least part of said public facilities with said shopping facilities;
  the complex having roof and wall facilities forming at least one shopping enclosure for said shopping facilities, and air-conditioning means connected with said shopping enclosure, for providing all-weather comfort within said enclosure; and
  wherein said waterway extends at least partway through said enclosure.

19. An integrated entertainment and resort complex, comprising:
  at least a first transportation hub;
  at least one shopping mall communicating with said transportation hub; and
  at least one riverwalk communicating with said transportation hub;
  at least a second transportation hub communicating with at least one of said riverwalk and shopping mall;
  wherein said shopping mall connects at least partway said first and second transportation hub;
  wherein said shopping mall includes shopping facilities and a plurality of public facilities and a pedestrian way connecting at least part of said public facilities with said shopping facilities; and
  wherein said shopping facilities include a theme park, said theme park including virtual reality display means for displaying selected themes.

20. A complex according to claim 19, wherein said shopping facilities include a street lined with trees and plants.

21. An integrated entertainment and resort complex, comprising
  at least a first transportation hub;
  at least one shopping mall communicating with said transportation hub;
  at least one riverwalk communicating with said transportation hub;
  at least a second transportation hub communicating with at least one of said riverwalk and shopping mall;
  wherein said shopping mall connects at least partway said first and second transportation hubs;
  wherein said riverwalk extends at least partway the distance between said first and second transportation hub;
  a waterway disposed proximal to and extending at least partway in parallel with said riverwalk;
  wherein said waterway is lined at least partway with trees and green plants; and
  wherein said waterway includes a concrete-lined trench filled with water, and water-level control means for maintaining said water at a preset level.

* * * * *